United States Patent
Suzuki et al.

(10) Patent No.: US 9,579,633 B2
(45) Date of Patent: Feb. 28, 2017

(54) CATALYTIC CONVERTER

(71) Applicant: TOYOTA JIDOSHA KABUSHIKI KAISHA, Toyota-shi, Aichi (JP)

(72) Inventors: Hiromasa Suzuki, Toyota (JP); Takeru Yoshida, Miyoshi (JP); Yoshinori Saito, Toyota (JP); Mitsuyoshi Okada, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/045,436

(22) Filed: Feb. 17, 2016

(65) Prior Publication Data

US 2016/0271590 A1    Sep. 22, 2016

(30) Foreign Application Priority Data

Mar. 20, 2015  (JP) ................. 2015-058620

(51) Int. Cl.

| *B01J 23/00* | (2006.01) |
|---|---|
| *B01J 23/10* | (2006.01) |
| *B01J 23/63* | (2006.01) |
| *B01J 35/04* | (2006.01) |
| *B01J 35/00* | (2006.01) |

(52) U.S. Cl.
CPC .......... *B01J 23/63* (2013.01); *B01J 35/0006* (2013.01); *B01J 35/04* (2013.01)

(58) Field of Classification Search
CPC ......... B01J 23/63; B01J 35/04; B01J 35/0006
USPC ....................................................... 502/303
See application file for complete search history.

(56) References Cited

U.S. PATENT DOCUMENTS

| 2006/0217263 A1* | 9/2006 | Kawamoto | B01D 53/945 502/304 |
|---|---|---|---|
| 2010/0263357 A1* | 10/2010 | Lindner | B01D 53/945 60/299 |
| 2012/0021899 A1 | 1/2012 | Nobukawa et al. | |

FOREIGN PATENT DOCUMENTS

| JP | 2009-285604 A | 12/2009 |
|---|---|---|
| JP | 2010-201284 A | 9/2010 |
| JP | 2012-24701 A | 2/2012 |
| WO | 2009/144568 A1 | 12/2009 |

* cited by examiner

*Primary Examiner* — Colleen Dunn
*Assistant Examiner* — Haytham Soliman
(74) *Attorney, Agent, or Firm* — Sughrue Mion, PLLC (57) ABSTRACT

A catalytic converter with excellent OSC performance and $NO_x$ purification performance. The catalytic converter includes a substrate with a cell structure and catalyst layer. The catalyst layer includes lower and upper catalyst layers. The upper catalyst layer includes a zirconia compound support with rhodium carried thereon that contains zirconia, lanthanum oxide, and yttrium oxide; an alumina compound without rhodium carried thereon that contains alumina and lanthanum oxide; and a ceria-zirconia-based composite oxide containing ceria, zirconia, lanthanum oxide, and neodymium oxide. The lower catalyst layer includes an alumina compound support with platinum carried thereon that contains alumina and lanthanum oxide that are the same materials as those of the alumina compound of the upper catalyst layer; and a ceria-zirconia-based composite oxide without platinum carried thereon that contains ceria, zirconia, lanthanum oxide, and neodymium oxide that are the same materials as those of the ceria-zirconia-based composite oxide of the upper catalyst layer.

1 Claim, 5 Drawing Sheets

CATALYTIC CONVERTER

CLAIM OF PRIORITY

The present application claims priority from Japanese patent application JP 2015-058620 filed on Mar. 20, 2015, the content of which is hereby incorporated by reference into this application.

BACKGROUND

Technical Field

The present invention, relates to a catalytic converter that is fixedly housed in a pipe of an exhaust system for exhaust gas.

Background Art

In a variety of industries, a variety of attempts has been made worldwide to reduce environmental impacts and burdens. In particular, in the automobile industry, development for promoting the spread of not only fuel-efficient gasoline engine vehicles, but also so-called eco-friendly vehicles, such as hybrid vehicles and electric vehicles, as well as for further improving the performance of such vehicles has been advanced day by day. In addition to the development of such eco-friendly vehicles, research about an exhaust gas purifying catalyst for purifying exhaust gas discharged from an engine has also been actively conducted. An exhaust gas purifying catalyst contains an oxidation catalyst, a three-way catalyst, a $NO_x$ storage-reduction catalyst, and the like. A noble metal catalyst, such as platinum (Pt), palladium (Pd), or rhodium (Rh), exhibits catalytic activity in the exhaust gas purifying catalyst. The noble metal catalyst is typically used while being carried on a support that is made of porous oxide, such as alumina ($Al_2O_3$).

A catalytic converter for purifying exhaust gas is typically arranged in an exhaust system for exhaust gas that connects a vehicle engine and a muffler. The engine may sometimes discharge environmentally harmful substances, such as CO, $NO_x$, and unburned ITC and VOC. In order to convert such harmful substances into allowable substances, exhaust gas is passed through a catalytic converter in which a catalyst layer, which has a noble metal catalyst, such as Rh, Pd, or Pt carried on a support, is arranged on the cell wall surface of a substrate, so that CO is converted into $CO_2$, and NO is converted into $N_2$ and $O_2$, while HC and VOC are burned to generate $CO_2$ and $H_2O$.

As a support on which a noble metal catalyst is carried, a ceria-zirconia-based composite oxide (which is also referred to as a $CeO_2$—$ZrO_2$ solid solution, a CZ material, and the like) can be used. This is also referred to as a promoter, and is an essential component of the aforementioned three-way catalyst for concurrently removing CO, $NO_x$, and HC that are harmful components in the exhaust gas. Examples of the essential component of the promoter include $CeO_2$. $CeO_2$ has a property that its oxidation number changes to $Ce^{3+}$ or $Ce^{4+}$, for example, depending on the partial pressure of oxygen in the exhaust gas to which $CeO_2$ is exposed, and has a function of absorbing and releasing oxygen as well as a function of storing oxygen (OSC: Oxygen Storage Capacity) to compensate for the deficiency and excess of electric charges. In addition, $CeO_2$ can absorb and mitigate fluctuations of the exhaust gas atmosphere and maintain the air/fuel ratio at a level around the theoretical air/fuel ratio in order to retain a purifying window of the three-way catalyst.

By the way, how to reduce the amount of a noble metal catalyst used in the aforementioned three-way catalyst is an important element to be considered from the perspective of cost competitiveness. However, when the amount of a noble metal catalyst in a three-way catalyst is significantly reduced, the catalytic activity also decreases significantly. Thus results in significantly degraded OSC performance and low-temperature activity as well as significantly degraded NO purification performance under a high-temperature environment, and the like. This occurs because a significantly reduced amount of a noble metal catalyst results in a significantly reduced number of active sites, and a significantly reduced number of catalytic reaction sites results in significantly degraded purification performance.

Among noble metal catalysts, such as Pt, Pd, and Rh, that are particularly used for a three-way catalyst, Rh is the most excellent in the NO purification performance, but is sold at the highest market price per unit weight. It has been known that when Rh is carried on a support that contains cerium oxide (ceria), higher OSC performance is exhibited. To the contrary, it has been also known that increasing the amount of cerium oxide in the support will degrade the NO purification performance that is a characteristic of Rh. Thus, when using Rh as a noble metal catalyst for a three-way catalyst, producing a three-way catalyst that is optimal in both the OSC performance and the NO purification performance is an urgent object to be achieved in the technical field.

Herein, Patent Document 1 discloses an exhaust gas purifying catalyst including a first oxygen storage material on which no noble metal is carried and that has a pyrochlore phase type regular array structure; and a second oxygen storage material that has a higher oxygen storage rate and a lower oxygen storage capacity than the first oxygen storage material, in which a platinum group noble metal is carried on the second oxygen storage material. According to such an exhaust gas purifying catalyst, it is possible to provide an exhaust gas purifying catalyst that has high NO purification performance after endurance.

Meanwhile, Patent Document 2 discloses an exhaust gas purifying catalyst having a first catalyst layer and a second catalyst layer that are sequentially formed on a support substrate, the first catalyst layer having rhodium carried thereon, and the second catalyst layer having platinum and palladium carried thereon, in which the ratio of the carried amount of palladium (y) to the carried amount of platinum (x) (y/x; molar ratio) satisfies 0<y/x≤1.0. According to such an exhaust gas purifying catalyst, it is possible to provide an exhaust gas purifying catalyst of a $NO_x$ storage-reduction type that has more excellent $NO_x$ purification performance.

Further, Patent Document 3 discloses an exhaust gas purifying catalyst that has a catalyst coat layer with a two-layer structure of a lower layer and an upper layer formed on the surface of the lower layer, in which at least one of Pt or Pd is carried on at least the upper layer, and 60% by mass or more of the total mass of Rh is carried on the lower layer. According to such an exhaust gas purifying catalyst, NO is efficiently oxidized by Pt in the upper layer in a lean atmosphere, so that the $NO_x$ storage efficiency is improved, while hydrogen generated in the lower layer passes through the upper layer in a stoichiometric to rich atmosphere, so that the $NO_x$ reduction efficiency is increased and sulfur poisoning can thus be solved.

By the way, when rhodium is carried on ceria, metallization of the rhodium is hindered, and the $NO_x$ purification performance is thus degraded as described above. Meanwhile, when the amount of ceria is increased to increase the oxygen storage capacity, a pressure loss is increased.

That is, even when the exhaust gas purifying catalysts disclosed in Patent Documents 1 to 3 are used, it is unclear whether or not a catalytic converter that is excellent in both the OSC performance and the $NO_x$ purification performance can be provided.

RELATED ART DOCUMENTS

Patent Documents

Patent Document 1: JP 2012-024701 A
Patent Document 2: JP 2010-201284 A
Patent Document 3: JP 2009-285604 A

SUMMARY

The present invention has been made in view of the foregoing problems, and it is an object of the present invention to provide a catalytic converter with excellent OSC performance and NO purification performance.

In order to achieve the above object, a catalytic converter in accordance with the present invention includes a substrate with a cell structure through which exhaust gas flows, and a catalyst layer formed on a cell wall surface of the substrate. The catalyst layer includes a lower catalyst layer and an upper catalyst layer, the lower catalyst layer being formed on a surface of the substrate, and the upper catalyst layer being formed on a surface of the lower catalyst layer. The upper catalyst layer includes a zirconia compound support with rhodium carried thereon, the zirconia compound support containing zirconia, lanthanum oxide, and yttrium oxide; an alumina compound without rhodium carried thereon, the alumina compound containing alumina and lanthanum oxide; and a ceria-zirconia-based composite oxide containing ceria, zirconia, lanthanum oxide, neodymium oxide. The lower catalyst layer includes an alumina compound support with platinum carried thereon, the alumina compound support containing alumina and lanthanum oxide that are the same materials as those of the alumina compound of the upper catalyst layer; and a ceria-zirconia-based composite oxide without platinum carried thereon, the ceria-zirconia-based composite oxide containing ceria, zirconia, lanthanum oxide, and neodymium oxide that are the same materials as those of the ceria-zirconia-based composite oxide of the upper catalyst layer.

The catalytic converter of the present invention is characterized in that the catalyst layer has a two-layer structure of a lower catalyst layer, which is formed on the surface of a substrate, and an upper catalyst layer formed thereon, and that each of the upper catalyst layer and the lower catalyst layer contains, as a promotor without rhodium or platinum, which is a noble metal catalyst, carried thereon, a promoter made of the same materials; specifically, the upper and lower catalyst layers each contains an alumina compound (which contains alumina and lanthanum oxide) and a ceria-zirconia-based composite oxide (a compound of ceria, zirconia, lanthanum oxide, and neodymium oxide).

According to the inventors, it has been found that as rhodium is carried on a support that does not contain ceria, the activity of rhodium is increased, which in turn increases the $NO_x$ purification rate.

In addition, as each of the upper and lower catalyst layers contains a promotor of the same materials, it is possible to obtain a good affinity at the interface between the upper and lower catalyst layers and thus increase the bond strength of the two layers.

Further, as the packed structure in each of the upper and lower catalyst layers is optimized, a catalytic converter with excellent USC performance is provided.

Herein, as the substrate with a cell structure, it is possible to use, in addition to cordierite made of a composite oxide of magnesium oxide, aluminum oxide, and silicon dioxide, or ceramic materials, such as silicon carbide, materials other than ceramic materials, such as metal materials. In addition, the substrate may have a so-called honeycomb structure with a number of cells whose lattice contour is a quadrangle, a hexagon, an octagon, or the like.

The lower catalyst layer that is formed on the cell wall surface of the substrate contains alumina ($Al_2O_3$), which is a support, and platinum (Pt) carried thereon, and further contains a ceria-zirconia-based composite oxide ($CeO_2$—$ZrO_2$ composite oxide). Herein, the alumina on which platinum is carried is an alumina compound containing alumina ($Al_2O_3$) and lanthanum oxide ($La_2O_3$). In addition, the ceria-zirconia-based composite oxide ($CeO_2$—$ZrO_2$ composite oxide) is a compound containing ceria ($CeO_2$), zirconia ($ZrO_2$), lanthanum oxide ($La_2O_3$), and neodymium oxide ($Nd_2O_3$).

Meanwhile, the upper catalyst layer contains, as described above, zirconia, which is a support, and rhodium (Rh) carried thereon, and also contains a compound of ceria ($CeO_2$), zirconia ($ZrO_2$), lanthanum oxide ($La_2O_3$), and neodymium oxide ($Nd_2O_3$) that are the same materials as those of the lower catalyst layer, and further contains an alumina compound containing alumina ($Al_2O_3$) and lanthanum oxide ($La_2O_3$). Herein, the zirconia on which rhodium is carried is a zirconia compound containing zirconia ($ZrO_2$), lanthanum oxide ($La_2O_3$), and yttrium oxide ($Y_2O_3$)).

Further, in another embodiment of the catalytic converter in accordance with the present invention, the upper catalyst layer is formed in the range of 80% of the total length of the substrate from an end, of the substrate on the downstream side of the exhaust gas flow direction, while the lower catalyst layer is formed in the range of 80% of the total length of the substrate from an end of a substrate on the upstream side of the exhaust gas flow direction. In particular, each of the upper catalyst layer and the lower catalyst layer is preferably formed in the range of 65 to 95% of the total length of the substrate.

The catalytic converter of the present invention preferably has a cordierite honeycomb support with excellent resistance to thermal shock. Alternatively, the catalytic converter may be an electrically heated converter (EHC). The electrically heated catalytic converter of this type has a honeycomb catalyst and a pair of electrodes attached thereto. When current is supplied to the pair of electrodes to heat the honeycomb catalyst, the activity of the honeycomb catalyst is increased, so that exhaust gas passing through the honeycomb catalyst is detoxified. When such a converter is applied to an exhaust system for exhaust gas that connects a vehicle engine and a muffler, it is possible to purify exhaust gas at room temperature and also purify exhaust gas at cold temperature by activating the catalyst through electric heating.

As can be understood from the foregoing description, the catalytic converter of the present invention has a catalyst layer with a two-layer structure of a lower catalyst layer, which is formed on the surface of a substrate, and an upper catalyst layer formed thereon. The upper catalyst layer includes a zirconia compound support with rhodium carried thereon, an alumina compound, and a ceria-zirconia-based composite oxide. The lower catalyst layer includes an alumina compound support with platinum carried thereon, the alumina compound support containing the same materials as the upper catalyst layer, and also includes a ceria-zirconia-based composite oxide containing the same materials as the upper catalyst layer. Thus, a catalyst converter with excellent OSC performance and $NO_x$ purification performance is provided.

DETAILED DESCRIPTION OF THE EMBODIMENT(S)

Hereinafter, embodiments of a catalytic converter of the present invention will be described with reference to the drawings. The catalytic converter shown in the drawings has an upper catalyst layer that is formed in the range of 80% of the total length of a substrate from an end of the substrate on the downstream side of the exhaust gas flow direction, and also has a lower catalyst layer that is formed in the range of 80% of the total length of the substrate from an end of the substrate on the upstream side of the exhaust gas flow direction. It should be noted that the length over which each of the upper catalyst layer and the lower catalyst layer is formed is preferably in the range of 65 to 95% of the total length of the substrate.

(Exhaust System for Exhaust Gas)

First, an exhaust system for exhaust gas in which the catalytic converter of the present invention is provided will be briefly described. An exhaust system for exhaust gas to which the catalytic converter of the present invention is applied has a configuration in which an engine, a catalytic converter, a three-way catalytic converter, a sub-muffler, and a main muffler are arranged and are mutually connected with system pipes so that exhaust gas generated in the engine flows through each part via the system pipe and is then discharged. Next, an embodiment of the catalytic converter will be described.

(Embodiment of Catalytic Converter)

Figure 1:
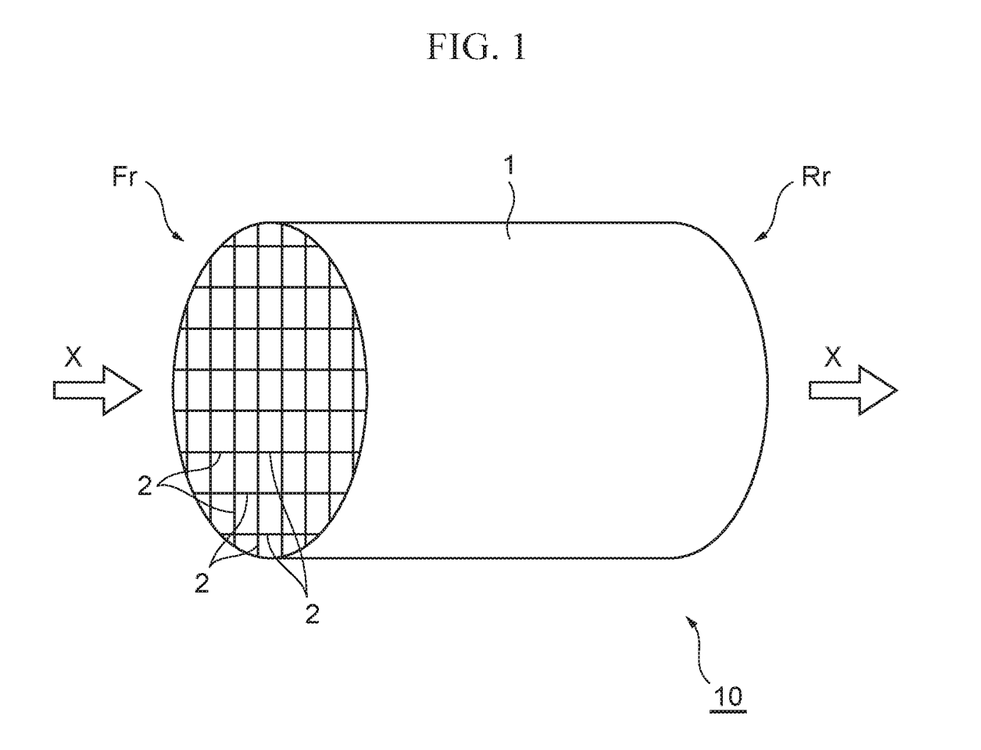
FIG. 1 is a schematic view of a catalytic converter of the present invention.
Figure 2:
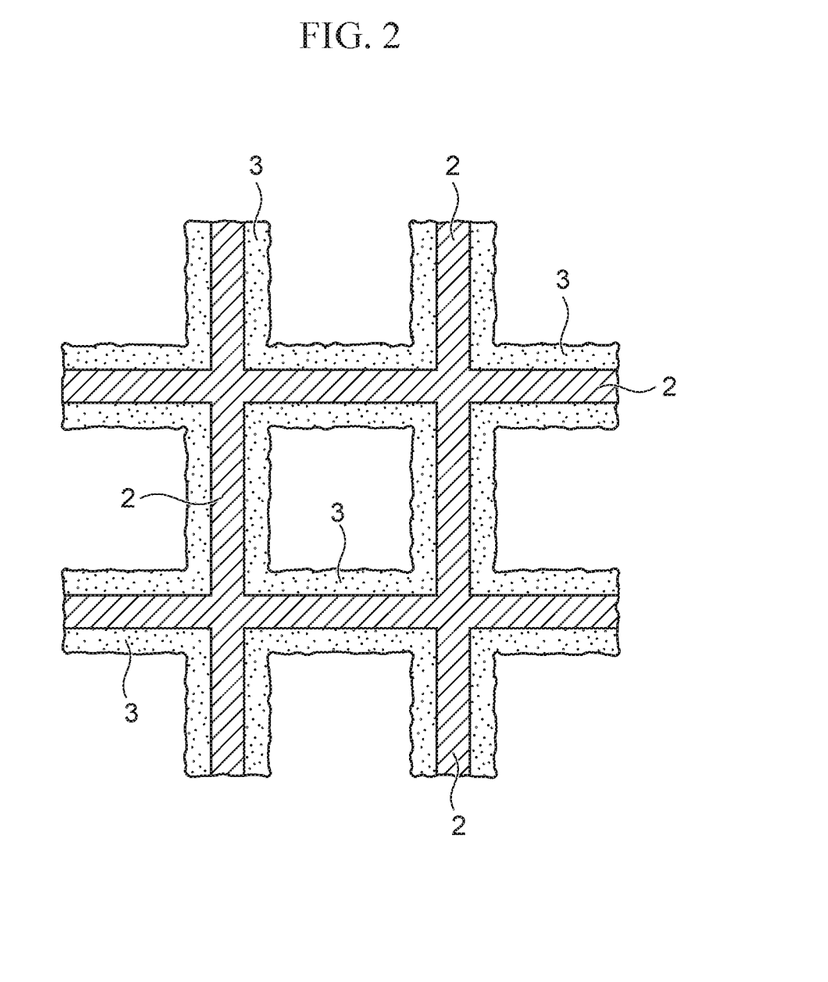
FIG. 2 is a partially enlarged view of a cell.
Figure 3:
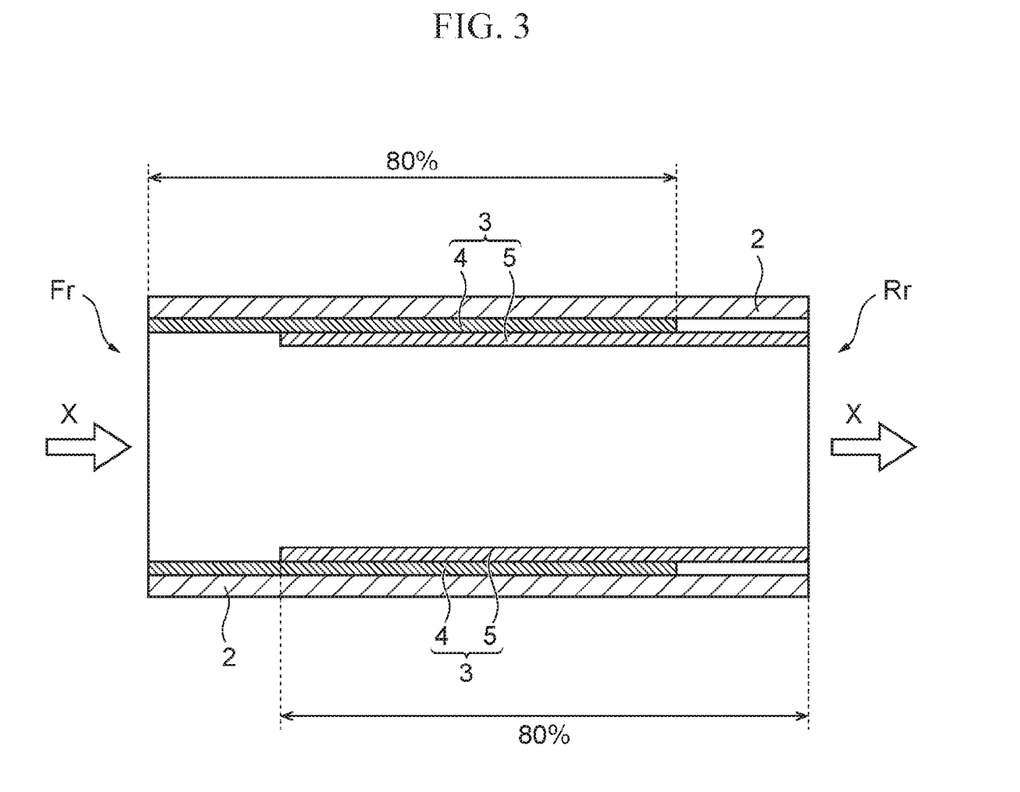
FIG. 3 is a longitudinal sectional view illustrating an embodiment of a catalyst layer.

FIG. 1 is a schematic view of the catalytic converter of the present invention. FIG. 2 is a partially enlarged view of a cell. FIG. 3 is a longitudinal sectional view illustrating an embodiment of a catalyst layer.

A catalytic converter 10 shown in FIG. 1 generally includes a cylindrical substrate 1 with a number of cells and a catalyst layer 3 formed on the surface of a cell wall 2 of each cell as shown in FIG. 2.

Herein, examples of the substrate 1 include cordierite made of a composite oxide of magnesium oxide, aluminum oxide, and silicon dioxide, ceramic materials, such as silicon carbide, and materials other than ceramic materials, such as metal materials.

The substrate 1 has a honeycomb structure with a number of cells whose lattice contour is a quadrangle, a hexagon, an octagon, or the like. Exhaust gas, which has entered a cell at an end of the substrate 1 on the upstream side (Fr side) of the exhaust gas flow direction, flows through the substrate 1, and is purified in this process, and then, the purified exhaust gas flows out from an end of the substrate 1 on the downstream side (Rr side) of the exhaust gas flow direction (x-direction).

Next, an embodiment of the catalyst layer will be described with reference to FIGS. 2 and 3.

The catalyst layer 3 shown in FIGS. 2 and 3 includes a lower catalyst layer 4 that is formed on the surface of a cell wall 2 and an upper catalyst layer 5 that is formed on the surface of the lower catalyst layer 4.

The lower catalyst layer 4 is formed in the range of 80% of the total length of the substrate 1 from the end of the substrate 1 on the upstream side Fr of the exhaust gas flow direction, while the upper catalyst layer 5 is formed in the range of 80% of the total length of the substrate 1 from the end of the substrate 1 on the downstream side Rr of the exhaust gas flow direction.

Herein, the lower catalyst layer 4 contains an alumina compound support (a compound of alumina ($Al_2O_3$) and lanthanum oxide ($La_2O_3$)) with platinum (Pt) carried thereon, and also contains a ceria-zirconia-based composite oxide (a compound of ceria ($CeO_2$), zirconia ($ZrO_2$) lanthanum oxide ($La_2O_3$), and neodymium oxide ($Nd_2O_3$)).

Meanwhile, the upper catalyst layer 5 contains a zirconia compound support (a compound of zirconia ($ZrO_2$), lanthanum oxide ($La_2O_3$), and yttrium oxide ($Y_2O_3$)) with rhodium (Rh) carried thereon, and also contains a ceria-zirconia-based composite oxide (a compound of ceria ($CeO_2$), zirconia ($ZrO_2$), lanthanum oxide ($La_2O_3$), and neodymium oxide ($Nd_2O_3$)) that are the same materials as those of the lower catalyst layer 4, and further contains an alumina compound (a compound of alumina ($Al_2O_3$) and lanthanum oxide ($La_2O_3$)) that are the same materials as those of the lower catalyst layer 4.

In the upper catalyst layer 5, rhodium (Rh) is carried only on the zirconia compound support that does not contain ceria. Such a structure can improve the $NO_x$ purification rate.

As each of the upper and lower catalyst layers 5 and 4 contains a promoter made of the same materials (a ceria-zirconia-based composite oxide and an alumina compound), the upper and lower catalyst layers 5 and 4 can have a good affinity at the interface and thus have high bond strength. Further, as the packed structure in each of the upper and lower catalyst layers 5 and 4 is optimized, the OSC performance is improved.

Thus, by having the catalyst layer 3 having a two-layer structure with high bond strength, the catalytic converter 10 with the upper and lower catalyst layers 5, 4 shown in the drawing becomes a catalytic converter with excellent OSC performance and $NO_x$ purification performance.

(Experiments for Verifying the $NO_x$ Purification Performance and OSC Performance and Results Thereof)

The inventors conducted experiments for verifying the $NO_x$ purification performance and OSC performance of catalyst converters. Example 1 and Comparative Examples 1-4 were produced using methods described below.

Comparative Example 1

In Comparative Example 1, the lower catalyst layer contains Pt as a catalyst (Pt(0.2)/$Al_2O_3$(25) CZ(30)), and the upper catalyst layer contains Rh as a catalyst (Rh(0.12)/$CeO_2$—$ZrO_2$ composite oxide(40)+$Al_2O_3$(20)). Herein, the unit of the numerical values in the parentheses is g/L. First, using nitric acid Pt, Pt/$Al_2O_3$ (i.e., material 1) in which Pt is carried on $Al_2O_3$ was prepared. Impregnation was used as a method for causing Pt to be carried on $Al_2O_3$. Next, a slurry 1 was prepared by pouring the material 1, a CZ material, and a $Al_2O_3$-based binder into distilled water while agitating them. Further, the prepared slurry 1 was poured into a substrate, and unnecessary portions were wiped away with a blower, so that the wall surface of the substrate was coated with the slurry 1. At that time, the coating material for the Pt layer was prepared such that the content of Pt, the content of the material 1, and the content of the CZ material with respect to the volume of the substrate were 0.2 g/L, 25 g/L, and 30 respectively. Finally, moisture was dried with a dryer kept at 120° C. for two hours, and baking was performed with an electric furnace at 500° C. for 2 hours. Likewise, using nitric acid Rh, a Rh/CZ material (i.e., material 2) in which Rh is carried on a CZ material was prepared. Herein, the $CeO_2$—$ZrO_2$ composite oxide contains 20-70 mass % $ZrO_2$, 20-70 mass % $CeO_2$, and 10-15 mass % $La_2O_3$, $Y_2O_3$, $Pr_6O_{11}$, and $Nd_2O_3$. Next, a slurry 2 was prepared by pouring the material 2, $Al_2O_3$, and an $Al_2O_3$-based binder into distilled water while agitating them such that the materials were suspended in the distilled water. The prepared slurry 2 was poured into the coated substrate, and unnecessary portions were wiped away with a blower, so that the wall surface of the substrate was coated with the slurry 2. At that time, the coating material for the Rh layer was prepared such that the content of Rh, the content of the material 2, and the content of $Al_2O_3$ with respect to the volume of the substrate were 0.12 g/L, 40 g/L, and 20 g/L, respectively. Finally, moisture was dried with a dryer kept at 120° C. for two hours, and baking was performed with an electric furnace at 500° C. for 2 hours.

Comparative Example 2

In Comparative Example 2, the lower catalyst layer contains Pt as a catalyst ($Pt(0.2)/Al_2O_3(25)+CZ(30)$), and the upper catalyst layer contains Rh as a catalyst ($Rh(0.12)/ZrO_2(40)+Al_2O_3(20)$). A slurry was prepared by changing the specifications of the Rh support (material 2) used for the slurry 2 in Comparative Example 1, and then, coating, drying, and baking were performed. Herein, $ZrO_2$ contains 80-90 mass % $ZrO_2$, and also contains 10-20 mass % $La_2O_3$, $Y_2O_3$, $Pr_6O_{11}$, and $Nd_2O_3$ as stabilizers.

Comparative Example 3

In Comparative Example 3, the lower catalyst layer contains Pt as a catalyst ($Pt(0.2)/Al_2O_3(25)+CZ(30)$), and the upper catalyst layer contains Rh as a catalyst (Rh layer $Rh(0.12)/CeO_2(40)+Al_2O_3(20)$). A slurry was prepared by changing the specifications of the Rh support (material 2) used for the slurry 2 in Comparative Example 1, and then, coating, drying, and baking were performed. With respect to the catalyst, the process was unchanged except that the composition of the material 2 in Comparative Example 1 was changed. Herein, as $CeO_2$, greater than or equal to 99 mass % $CeO_2$ was used.

Example 1

In Example 1, the lower catalyst layer contains Pt as a catalyst ($Pt(0.2)/Al_2O_3(25)+CZ(30)$), and the upper catalyst layer contains Rh as a catalyst ($Rh(0.12)/ZrO_2(40)+CZ(15)+Al_2O_3(20)$). A slurry 2 was prepared by changing the specifications of the Rh support (material 2) used for the slurry 2 in Comparative Example 1, and then, coating, drying, and baking were performed. With respect to the catalyst, the process was unchanged except that the composition of the material 2 in Comparative Example 1 was changed. Herein, $ZrO_2$ contains 80-90 mass % $ZrO_2$, and also contains 10-20 mass % $La_2O_3$, $Y_2O_3$, $Pr_6O_{11}$, and $Nd_2O_3$ as stabilizers. In addition, the CZ material contains 20-70 mass % $ZrO_2$, 20-70 mass % $CeO_2$, and 10-15 mass % $La_2O_3$, $Y_2O_3$, $Pr_6O_{11}$, and $Nd_2O_3$.

Comparative Example 4

In Comparative Example 4, the lower catalyst layer contains Pt as a catalyst ($Pt(0.2)/Al_2O_3(25)+CZ(30)$), and the upper catalyst layer contains Rh as a catalyst ($Rh(0.12)/CeO_2(40)+CZ(15)+Al_2O_3(20)$). A slurry 2 was prepared by changing the specifications of the Rh support (material 2) used for the slurry 2 in Comparative Example 1, and then, coating, drying, and baking were performed. With respect to the catalyst, the process was unchanged except that the composition of the material 2 in Comparative Example 1 was changed. Herein, as $CeO_2$, greater than or equal to 99 mass % $CeO_2$ was used. In addition, the CZ material contains 20-70 mass % $ZrO_2$, 20-70 mass % $CeO_2$, and 10-15 mass % $La_2O_3$, $Y_2O_3$, $Pr_6O_{11}$, and $Nd_2O_3$.

Evaluation Method

A 4.3 L V8 cylinder gasoline engine was used, and the bed temperature of a catalyst on the downstream side was set to 950° C., so that a cycle that includes feedback, fuel cut, rich, and lean per minute as a condition was conducted for 50 hours.

An aged catalytic converter was mounted, and the purification rate for when the entering gas atmosphere was periodically switched between the rich and lean sides of the A/F ratio was measured. In addition, an aged catalytic converter was mounted, and the purification rate for when the entering gas atmosphere was continuously maintained on the rich side of the A/F ratio was also measured.

Table 1 below shows the materials used herein.

TABLE 1

| Portion | Name of Material | Producer | Composition |
|---|---|---|---|
| Upper Catalyst Layer (Rh Layer) | $ZrO_2$ | DAIICHI KIGENSO KAGAKU KOGYO Co., LTD. | $ZrO_2$ (84 mass %), $La_2O_3$ (6 mass %), $Y_2O_3$ (10 mass %) |
| | $CeO_2$—$ZrO_2$ | DAIICHI KIGENSO KAGAKU KOGYO Co., LTD. | $CeO_2$ (21 mass %), $ZrO_2$ (72 mass %), $La_2O_3$ (1.7 mass %), $Nd_2O_3$ (5.3 mass %) |
| | $Al_2O_3$ | Sasol | $Al_2O_3$ (99 mass %), $La_2O_3$ (1 mass %) |
| Lower Catalyst Layer (Pt Layer) | $CeO_2$—$ZrO_2$ | DAIICHI KIGENSO KAGAKU KOGYO Co., LTD. | $CeO_2$ (21 mass %), $ZrO_2$ (72 mass %), $La_2O_3$ (1.7 mass %), $Nd_2O_3$ (5.3 mass %) |
| | $Al_2O_3$ | Sasol | $Al_2O_3$ (99 mass %), $La_2O_3$ (1 mass %) |

Results of Experiment

Figure 4:
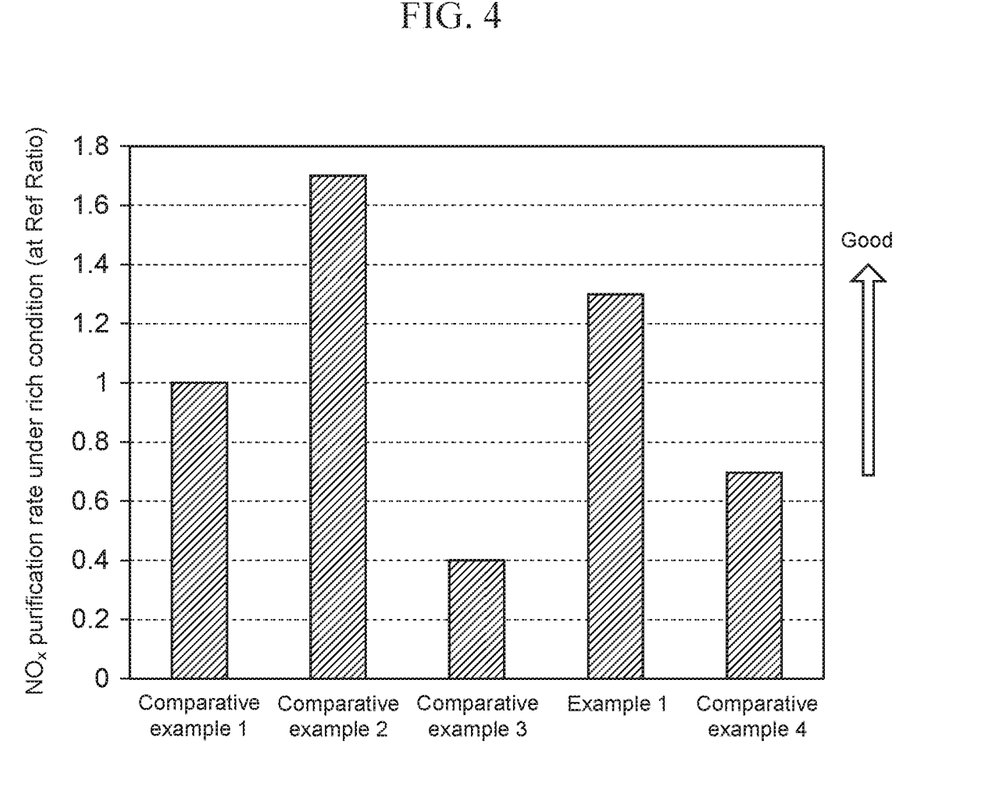
FIG. 4 is a graph showing the experimental results for verifying the $NO_x$ purification performance.
Figure 5:
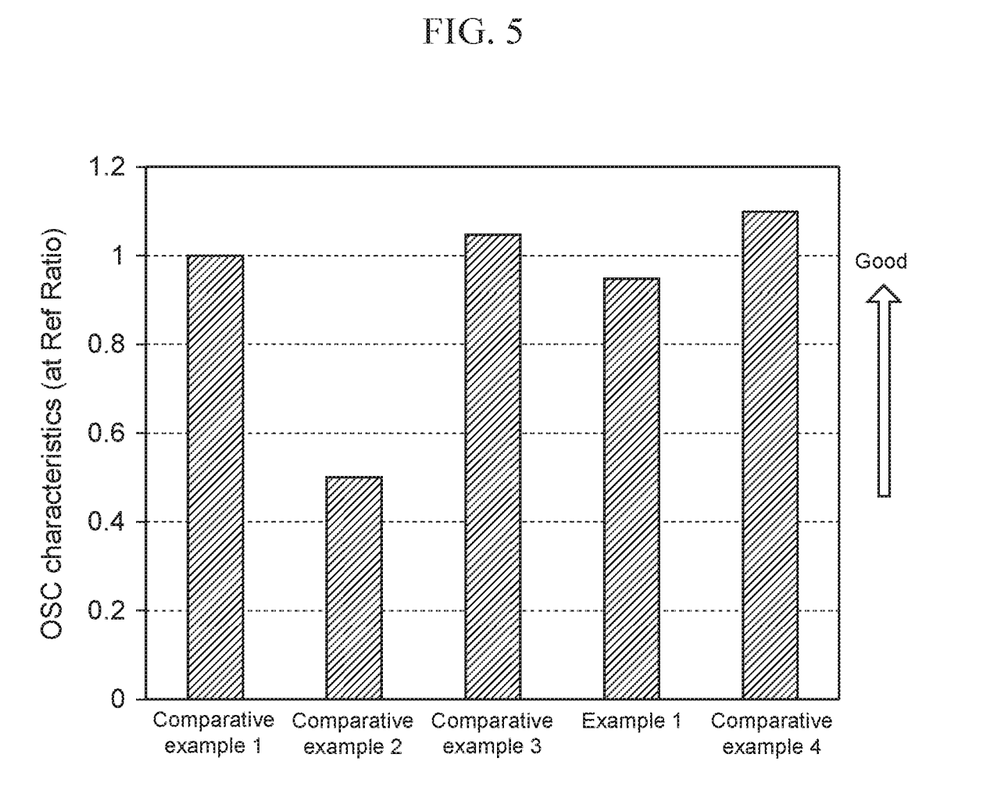
FIG. 5 is a graph showing the experimental results for verifying the OSC performance.

FIGS. 4 and 5 each show the experimental results. Herein, FIG. 4 is a graph showing the experimental results for verifying the $NO_x$ purification performance. FIG. 5 is a graph showing the experimental results for verifying the OSC performance. In each of FIGS. 4 and 5, the result of Comparative Example 1 is shown as a reference, and the results of other Comparative Examples and Example are shown as the proportions to the result of Comparative Example 1.

FIG. 4 can confirm that Comparative Example 2 and Example 1 show excellent results of $NO_x$ purification rates, while the other samples show low NO purification rates.

Meanwhile, FIG. 5 can confirm that all samples other than Comparative Example 2 have high OSC performance at substantially the same level.

From the results of FIGS. 4 and 5, it can be confirmed that only Example 1 shows excellent results of both the NO purification performance and the OSC performance. This is considered to be due to the compositions of the upper catalyst layer and the lower catalyst layer of Example 1. This shows that the catalytic converter of the present invention has excellent NO purification performance and OSC performance.

Although the embodiments of the present invention have been described in detail with reference to the drawings, specific structures are not limited thereto, and any design changes that may occur within the spirit and scope of the present invention are all included in the present invention.

DESCRIPTION OF SYMBOLS

1 Substrate
2 Cell Wall
3 Catalyst Layer
4 Lower Catalyst Layer
5 Upper Catalyst Layer
10 Catalytic converter
Fr Upstream side of the exhaust gas flow direction
Rr Downstream side of the exhaust gas flow direction

What is claimed is:

1. A catalytic converter comprising:
a substrate with a cell structure through which exhaust gas flows; and
a catalyst layer formed on a cell wall surface of the substrate, wherein
the catalyst layer includes a lower catalyst layer and an upper catalyst layer, the lower catalyst layer being formed on a surface of the substrate, and the upper catalyst layer being formed on a surface of the lower catalyst layer, wherein,
the upper catalyst layer includes
a zirconia compound support with rhodium carried thereon, the zirconia compound support containing zirconia, lanthanum oxide, and yttrium oxide,
an alumina compound without a noble metal catalyst carried thereon, the alumina compound containing alumina and lanthanum oxide, and
a ceria-zirconia-based composite oxide containing ceria, zirconia, lanthanum oxide, and neodymium oxide, and
the lower catalyst layer includes
an alumina compound support with platinum carried thereon, the alumina compound support containing alumina and lanthanum oxide that are the same materials as those of the alumina compound of the upper catalyst layer, and
a ceria-zirconia-based composite oxide without a noble metal catalyst carried thereon, the ceria-zirconia-based composite oxide containing ceria, zirconia, lanthanum oxide, and neodymium oxide that are the same materials as those of the ceria-zirconia-based composite oxide of the upper catalyst layer.

* * * * *